US012581150B2

(12) United States Patent
Sim et al.

(10) Patent No.: US 12,581,150 B2
(45) Date of Patent: Mar. 17, 2026

(54) DISPLAY SYSTEM AND METHOD OF OPERATING THE SAME

(71) Applicant: Top Victory Investments Limited, Hong Kong (HK)

(72) Inventors: Mark Sim, Singapore (SG); Albert Lin, Taipei City (TW)

(73) Assignee: TOP VICTORY INVESTMENTS LIMITED, Hong Kong (HK)

( * ) Notice: Subject to any disclaimer, the term of this patent is extended or adjusted under 35 U.S.C. 154(b) by 0 days.

(21) Appl. No.: 18/988,647

(22) Filed: Dec. 19, 2024

(65) Prior Publication Data

US 2025/0380019 A1 Dec. 11, 2025

(30) Foreign Application Priority Data

Jun. 7, 2024 (TW) ................................. 113121195

(51) Int. Cl.
H04N 21/422 (2011.01)

(52) U.S. Cl.
CPC ... H04N 21/4221 (2013.01); H04N 21/42214 (2013.01); H04N 21/42221 (2013.01); H04N 21/42225 (2013.01)

(58) Field of Classification Search
CPC ......... H04N 21/4221; H04N 21/42221; H04N 21/42225; H04N 21/42214; H04N 21/422; H04N 21/4222

USPC ..................... 348/734; 725/37, 60, 64, 120; 340/426.13, 12.22, 815.6
See application file for complete search history.

(56) References Cited

U.S. PATENT DOCUMENTS 8,638,397 B2 * 1/2014 Ueno ............... H04N 21/42204
                                                        348/734
2013/0194511 A1 * 8/2013 Tian ..................... H04N 13/398
                                                        348/734

* cited by examiner

*Primary Examiner* — Sherrie Hsia
(74) *Attorney, Agent, or Firm* — HSML P.C.

(57) ABSTRACT

A display system includes a display that includes a display processing unit, and a remote control (RC) that includes an RC processing unit and an illuminated button. The illuminated button is configured to switch between an illuminating state and a non-illuminating state, output a first operating signal upon being pressed when in the non-illuminating state, and output a second operating signal upon being pressed when in the illuminating state. The RC processing unit is configured to transmit a first command signal that corresponds to the first operating signal, and transmit a second command signal that corresponds to the second operating signal. The display processing unit is configured to execute a first operation based on the first command signal, and to execute a second operation based on the second command signal.

15 Claims, 5 Drawing Sheets

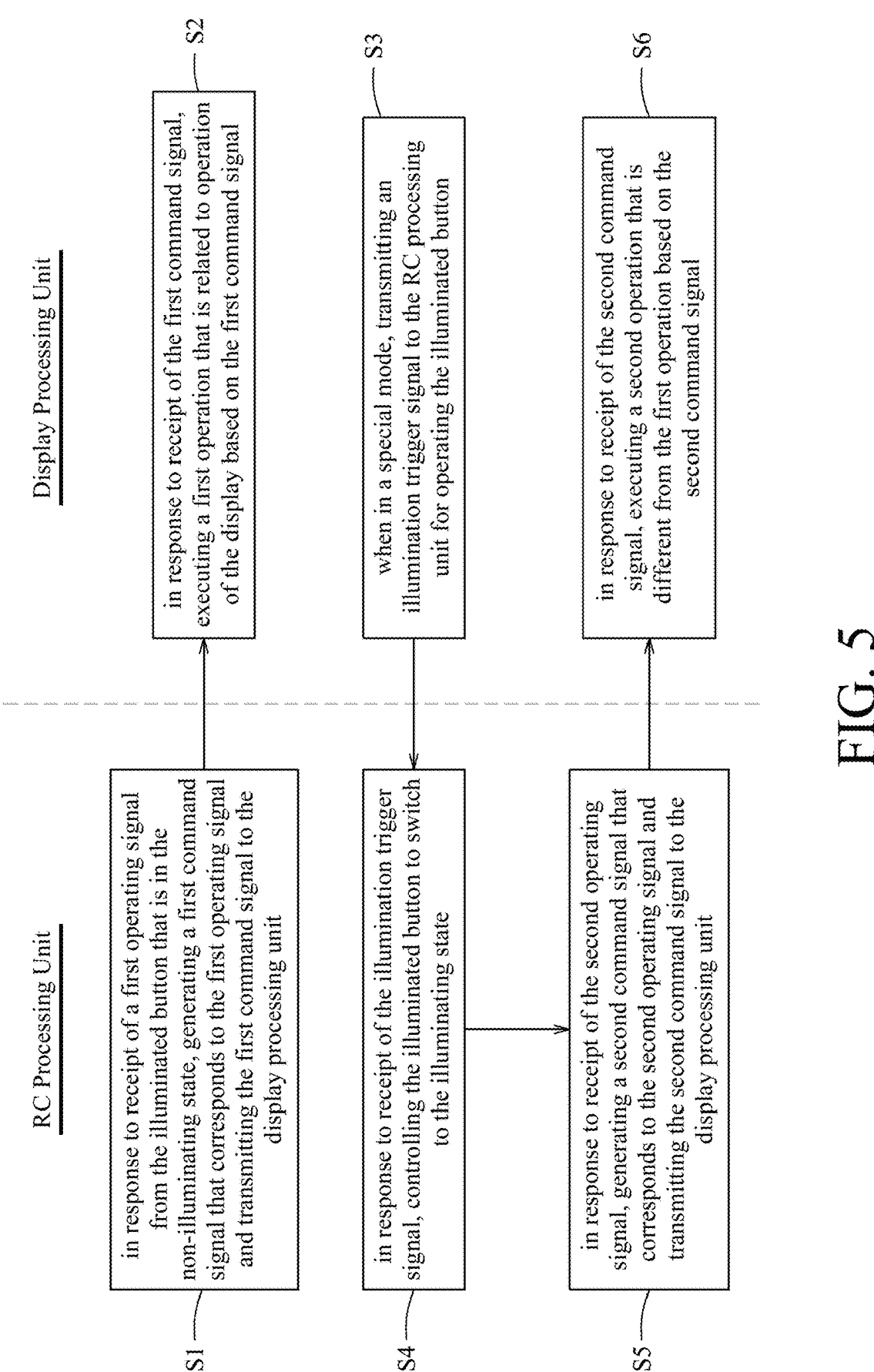

Display Processing Unit

S2 — in response to receipt of the first command signal, executing a first operation that is related to operation of the display based on the first command signal S3 — when in a special mode, transmitting an illumination trigger signal to the RC processing unit for operating the illuminated button S6 — in response to receipt of the second command signal, executing a second operation that is different from the first operation based on the second command signal RC Processing Unit S1 — in response to receipt of a first operating signal from the illuminated button that is in the non-illuminating state, generating a first command signal that corresponds to the first operating signal and transmitting the first command signal to the display processing unit S4 — in response to receipt of the illumination trigger signal, controlling the illuminated button to switch to the illuminating state S5 — in response to receipt of the second operating signal, generating a second command signal that corresponds to the second operating signal and transmitting the second command signal to the display processing unit

FIG. 5

DISPLAY SYSTEM AND METHOD OF OPERATING THE SAME

CROSS-REFERENCE TO RELATED APPLICATION

This application claims priority to Taiwanese Invention Patent Application No. 113121195, filed on Jun. 7, 2024, the entire disclosure of which is incorporated by reference herein.

FIELD

The disclosure relates to a display system and a method of operating a display system.

BACKGROUND

In recent years, household display devices have undergone rapid evolution. For example, the rise of smart televisions (TVs) significantly altered the watching habits of viewers. In addition to being able to receive traditional cable television signals, the smart TVs are able to connect to various streaming platforms via the Internet, thereby offering a richer and more diverse range of audio-visual features.

However, the development of household display devices has posed challenges for the design of remote controls. Specifically, the more functions a household display device incorporates, the more buttons must be added to the remote control. This makes it difficult to reduce the size of the remote control, and an abundance of buttons on a remote control may also create a burden for a user when the user operates the household display device.

SUMMARY

Therefore, an object of the disclosure is to provide a display system and method of operating the same that can alleviate at least one of the drawbacks of the prior art.

According to an aspect of the disclosure, the display system includes a display, and a remote control (RC). The display includes a display processing unit. The RC includes an RC processing unit that is configured to be wirelessly connected to the display processing unit, and an illuminated button that is electrically connected to the RC processing unit. The illuminated button is configured to be controlled by the RC processing unit to switch between an illuminating state and a non-illuminating state. The illuminated button is configured to output a first operating signal to the RC processing unit upon being pressed when the illuminated button is in the non-illuminating state. The RC processing unit is configured to, in response to receipt of the first operating signal, generate a first command signal that corresponds to the first operating signal and transmit the first command signal to the display processing unit. The display processing unit is configured to, in response to receipt of the first command signal, execute a first operation that is related to operation of the display based on the first command signal. When the display processing unit is in a special mode, the display processing unit is configured to transmit an illumination trigger signal to the RC processing unit for operating the illuminated button, and the RC processing unit is further configured to, in response to receipt of the illumination trigger signal, control the illuminated button to switch from the non-illuminating state to the illuminating state. The illuminated button is further configured to output a second operating signal to the RC processing unit upon being pressed when the illuminated button is in the illuminating state. The RC processing unit is further configured to, in response to receipt of the second operating signal, generate a second command signal that corresponds to the second operating signal and transmit the second command signal to the display processing unit. The display processing unit is further configured to, in response to receipt of the second command signal, execute a second operation that is different from the first operation based on the second command signal.

According to another aspect of the disclosure, the method of operating the display system as mentioned above includes: the illuminated button outputting a first operating signal to the RC processing unit upon being pressed when the illuminated button is in the non-illuminating state; the RC processing unit, in response to receipt of the first operating signal, generating a first command signal that corresponds to the first operating signal, and transmitting the first command signal to the display processing unit; the display processing unit, in response to receipt of the first command signal, executing a first operation that is related to operation of the display based on the first command signal; the display processing unit, when in a special mode, transmitting an illuminated trigger signal to the RC processing unit for operating the illuminated button; the RC processing unit, in response to receipt of the illumination trigger signal, controlling the illuminated button to switch from the non-illuminating state to the illuminating state; the illuminated button outputting a second operating signal to the RC processing unit upon being pressed when the illuminated button is in the illuminating state; the RC processing unit, in response to receipt of the second operating signal, generating a second command signal that corresponds to the second operating signal and transmitting the second command signal to the display processing unit; and the display processing unit, in response to receipt of the second command signal, executing a second operation that is different from the first operation based on the second command signal.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

FIG. 5 is a flow chart illustrating a method of operating a display system according to the present disclosure.

DETAILED DESCRIPTION

Figure 1:
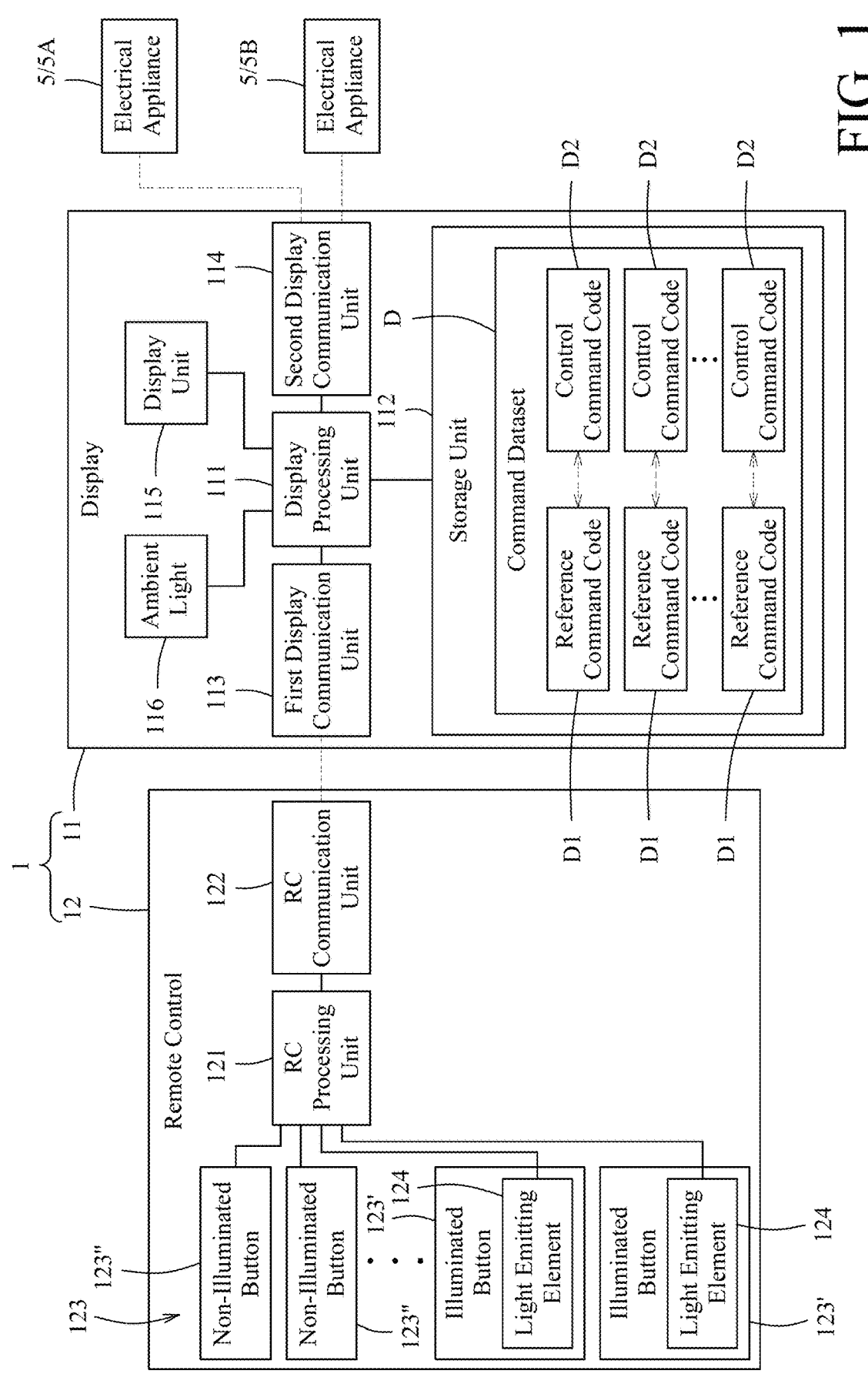
FIG. 1 is a block diagram of a display system according to an embodiment of the present disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Throughout the disclosure, the term "coupled to" or "connected to" may refer to a direct connection among a plurality of electrical apparatus/devices/equipment via an electrically conductive material (e.g., an electrical wire), or an indirect connection between two electrical apparatus/devices/equipment via another one or more apparatus/devices/equipment, or wireless communication.

In this disclosure, the term "unit" may refer to a single electronic component with a specific function, or a group of electronic components with similar functions. For example, a "processing unit" may refer to a single processor with data processing capabilities, or a collection of processors.

Referring to FIG. 1, a display system 1 according to an embodiment of the present disclosure includes a display 11 and a remote control (RC) 12. In this embodiment, the display 11 is exemplified as a smart television (TV), and the RC 12 is exemplified as an RC of the smart TV. However, in other embodiments, the display 11 may be a desktop monitor, and the display 11 is not limited to such.

The display 11 includes a display processing unit 111, and a storage unit 112, a first display communication unit 113, a second display communication unit 114, and a display unit 115 that are electrically connected to the display processing unit 111.

The RC 12 includes an RC processing unit 121 wirelessly connected to the display processing unit 111, and an RC communication unit 122 and a set of buttons 123 that are electrically connected to the RC processing unit 121.

In this embodiment, each of the display processing unit 111 and the RC processing unit 121 is exemplified by a processor that is realized by an integrated circuit and that has a function of command transmission and reception.

The storage unit 112 is exemplified by a computer-readable storage medium capable of storing digital data. Specifically, the storage unit 112 is exemplified as a flash memory or an electrically erasable programmable read-only memory (EEPROM).

Each of the first display communication unit 113 and the RC communication unit 122 is exemplified by a Bluetooth® communication module that complies with the Bluetooth® communication standard. Preferably, each of the first display communication unit 113 and the RC communication unit 122 uses the Bluetooth® Low Energy (Bluetooth® LE or BLE) technology. The Bluetooth® communication standard may be, for example, but not limited to, Bluetooth® 4.2 LE, Bluetooth® 5.0, Bluetooth® 5.1, Bluetooth® 5.2, or Bluetooth® 5.3.

The display processing unit 111 performs Bluetooth® wireless transmission through the first display communication unit 113, and the RC processing unit 121 performs Bluetooth® wireless transmission through the RC communication unit 122. In this embodiment, the RC processing unit 121 and the display processing unit 111 communicate wirelessly with each other via Bluetooth® communication through the RC communication unit 122 and the first display communication unit 113, respectively. In other embodiments, each of the first display communication unit 113 and the RC communication unit 122 may be exemplified by an Infrared (IR) module. That is to say, the RC processing unit 121 may communicate wirelessly with the display processing unit 111 using, for example, IR communication.

The second display communication unit 114 is exemplified by a Wi-Fi module based on the IEEE 802.11 standard. Specifically, the second display communication unit 114 may be implemented using, for example, a Wi-Fi module that complies with the wireless network protocol of Wi-Fi 6, Wi-Fi 6E, or Wi-Fi 7. In other embodiments, the second display communication unit 114 may be, for example, but not limited to, a wireless network module that is based on the IEEE 802.15.4 standard, or a wired network module that is based on the IEEE 802.3 Ethernet standard.

The display unit 115 is exemplified by a display screen, and is controllable by the display processing unit 111 to display images. In some embodiments, the display unit 115 may be exemplified as a thin film transistor liquid crystal display (TFT-LCD) or an organic light emitting diode (OLED) display.

In this embodiment, the display processing unit 111 is wirelessly connected to multiple electrical appliances 5 (only two are shown in FIG. 1) through the second display communication unit 114. Specifically, the second display communication unit 114 communicates wirelessly with the electrical appliances 5 using Wi-Fi communication, but the wireless communication method is not limited to such. In an application environment of this embodiment, the electrical appliances 5 are exemplified as smart home appliances in an Internet of things (IoT) (i.e., each of the electrical appliances 5 is an IoT device), and may be for example, but not limited to, an audio equipment, a TV set-top box (STB), a video surveillance equipment, an air conditioner, a dehumidifier, a refrigerator, etc. It should be noted that, the display processing unit 111 may be connected to any number (e.g., one or five) of electrical appliances 5 through the second display communication unit 114 when the display system 1 according to this disclosure is used in different application environments.

The storage unit 112 stores a command dataset (D) including a plurality of reference command codes (D1), and a plurality of control command codes (D2) that correspond respectively to the plurality of reference command codes (D1). The control command codes (D2) are related to different operations of the electrical appliances 5. A number of the reference command codes (D1) that is equivalent to a number of the control command codes (D2) is related to a number of the electrical appliances 5 and a number of functions of each of the electrical appliances 5 that are controllable by the RC 12.

Each of the reference command codes (D1) corresponds to a command signal that is generated by the RC processing unit 121 and that is transmitted through the RC communication unit 122. Specifically, the command signal corresponding to one of the reference command codes (D1) will be received by the display processing unit 111 and is for remotely controlling one of the electrical appliances 5.

Each of the control command codes (D2) corresponds to one of the electrical appliances 5. For each of the control command codes (D2), the display processing unit 111 is configured to generate a control signal based on the control command code (D2) and transmit the control signal to a corresponding one of the electrical appliances 5 through the second display communication unit 114 for controlling operation of the corresponding one of the electrical appliances 5. That is to say, the control signal includes the corresponding one of the control command codes (D2). Each of the control command codes (D2) is recognizable by the corresponding one of the electrical appliances 5. In this embodiment, the display processing unit 111 transmits the control signal including the corresponding one of the control command codes (D2) to the corresponding one of the electrical appliances 5 through the second display communication unit 114. Specifically, the display processing unit 111 establishes wireless communication network with the corresponding one of the electrical appliances 5 through Wi-Fi communication, and controls an operation of the corresponding one of the electrical appliances 5 through said Wi-Fi communication.

The command dataset (D) including the reference command codes (D1) and the control command codes (D2) is pre-generated by the display processing unit 111. Specifically, the display processing unit 111 generates the reference command codes (D1) and the control command codes (D2) by executing multiple pairing procedures that are related respectively to the electrical appliances 5. Each of the pairing procedures is used to enable the display 11 and the corresponding one of the electrical appliances 5 to start communicating with each other, and to pair one or more buttons of the set of buttons 123 of the RC 12 with one or more of the operations of the corresponding one of the electrical appliances 5. A manner in which the display processing unit 111 executes the pairing procedures is by utilizing existing technologies used in IoT applications. The manner of the display processing unit 111 executing the pairing procedures is not the focus of this disclosure, and therefore details thereof will be omitted for the sake of brevity.

Figure 2:
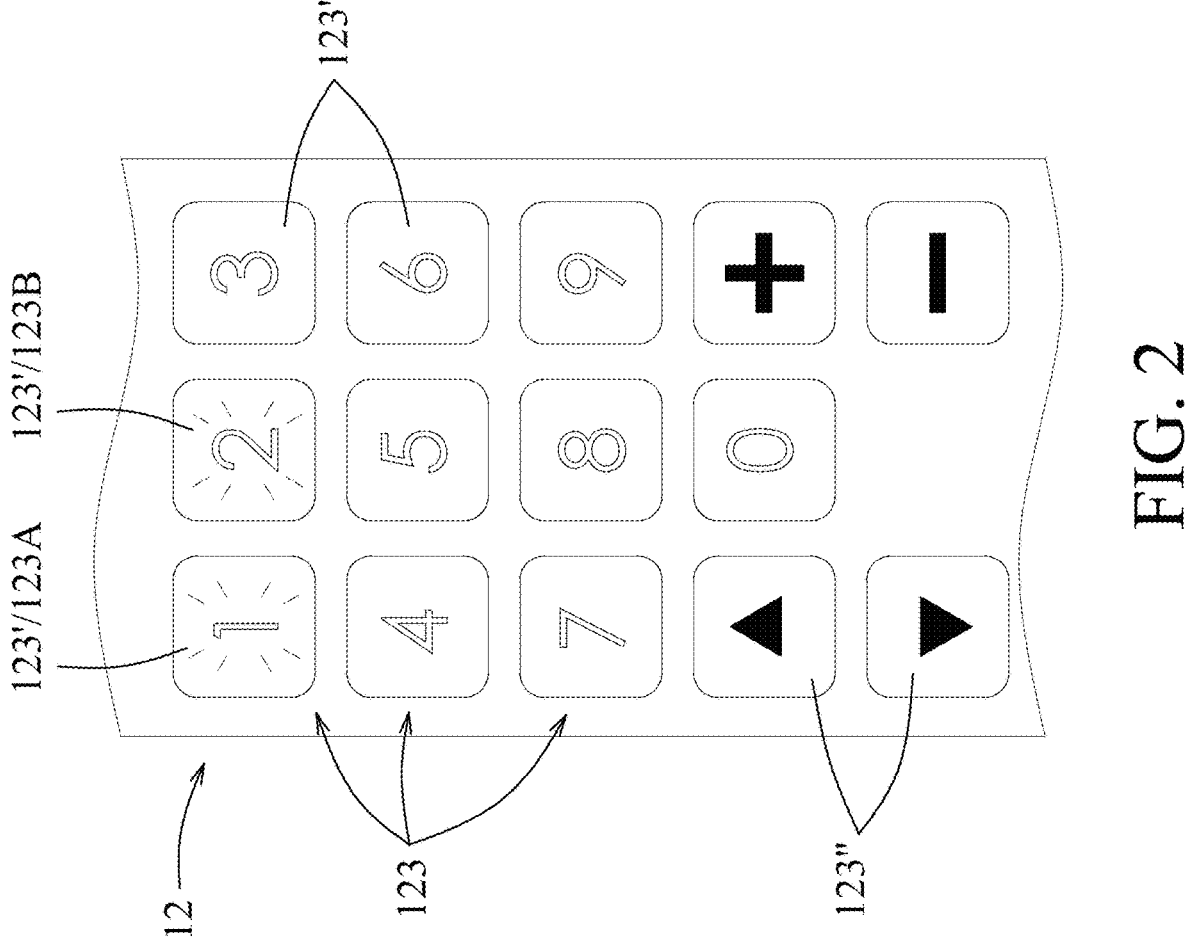
FIG. 2 is a fragmentary schematic view of a remote control of the display system according to an embodiment of the present disclosure.

Referring to FIG. 2, each button of the set of buttons 123 of the RC 12 is operable by a user pressing on the button. In this embodiment, the set of buttons 123 include a plurality of illuminated buttons 123' and a plurality of non-illuminated buttons 123". For example, in FIG. 2, the illuminated buttons 123' are the buttons that have Arabic numeral patterns on them.

Figure 3:
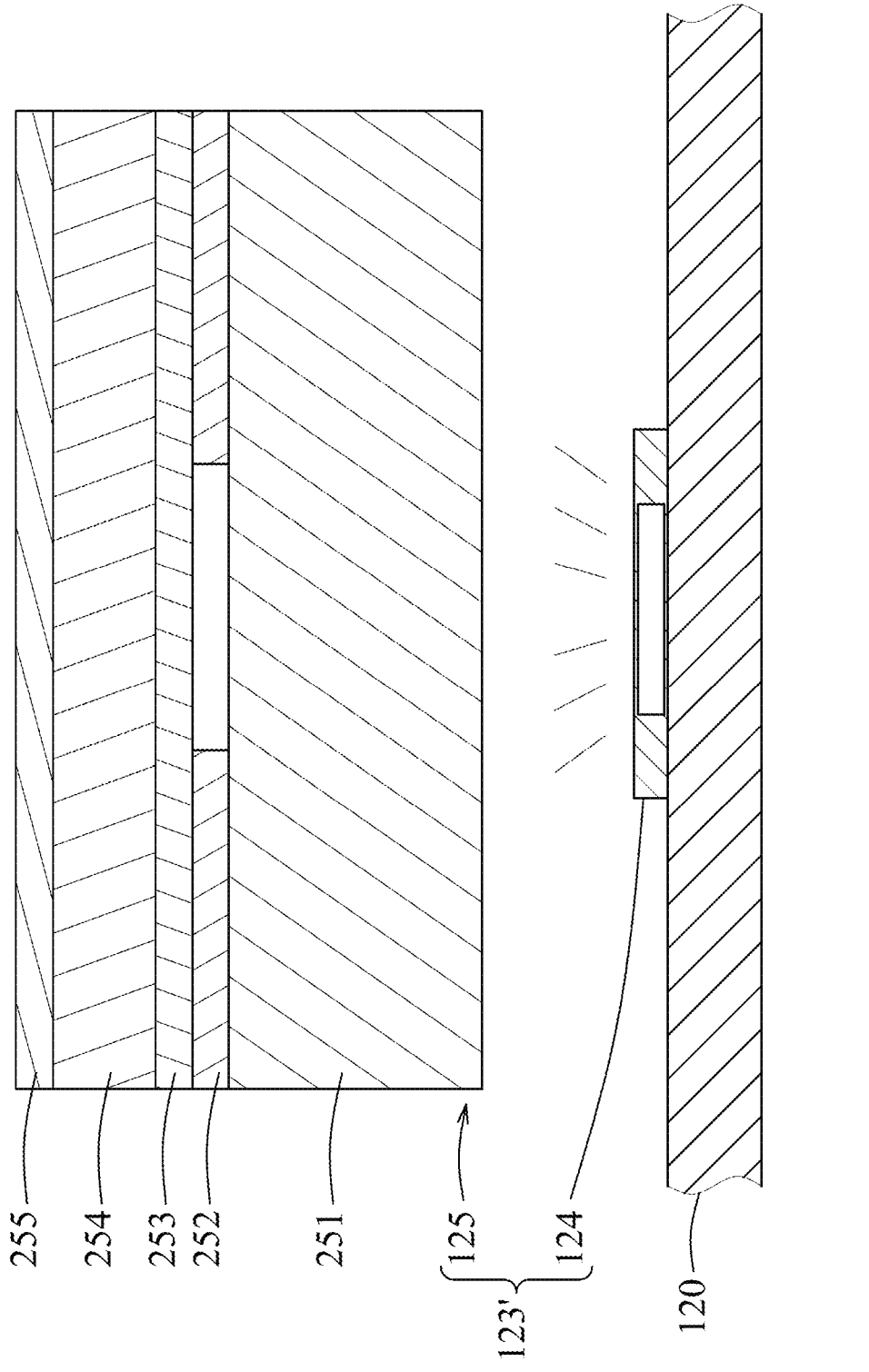
FIG. 3 is a fragmentary sectional view of an illuminated button of the remote control according to an embodiment of the present disclosure.

Referring to FIGS. 1 and 3, each of the illuminated buttons 123' includes a light emitting element 124 that is electrically connected to the RC processing unit 121, and a button body 125 that is disposed on the light emitting element 124. It should be noted that, a restoring support structure that enables the button body 125 to automatically return to an original position after the button body 125 is released is an existing technology that is well known in the art, and is therefore omitted in this disclosure for the sake of brevity.

The light emitting element 124 is exemplified as a light emitting diode (LED). The light emitting element 124 is disposed on a circuit board 120 in the RC 12. The RC processing unit 121 is configured to control the light emitting element 124 to emit light or to not emit light.

The button body 125 includes a light-permeable substrate 251, a pattern layer 252 disposed on top of the light-permeable substrate 251, a light-colored translucent layer 253 disposed on top of the pattern layer 252, a light-permeable button cap 254 disposed on top of the light-colored translucent layer 253, and a dark-colored translucent layer 255 disposed on top of the light-permeable button cap 254.

The light-permeable substrate 251 is made of, for example, rubber, and is transparent. The light-permeable button cap 254 is made of, for example, plastic, and is translucent. The button body 125, the pattern layer 252, the light-colored translucent layer 253, and the dark-colored translucent layer 255 are formed by a manufacturing process such as spraying; however, the disclosure is not limited to thus.

Figure 4:
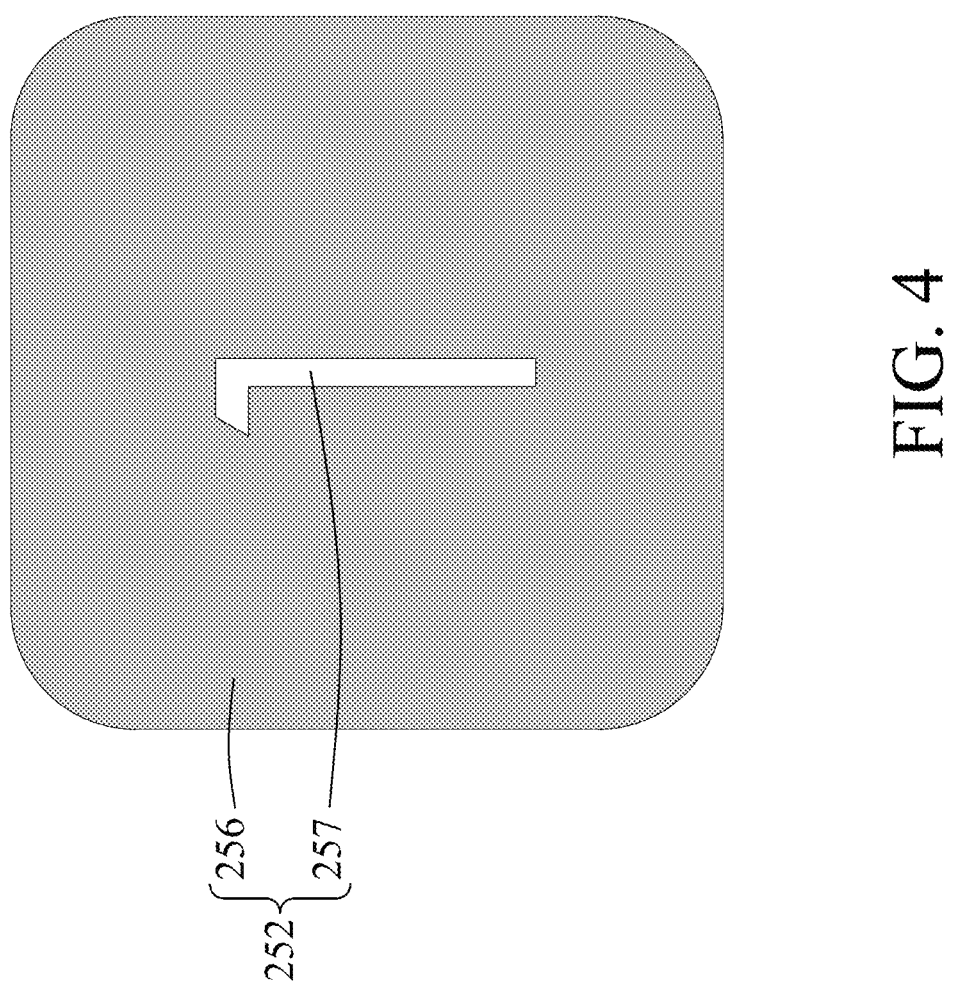
FIG. 4 is a schematic view illustrating a pattern layer of the illuminated button according to an embodiment of the present disclosure.

Further referring to FIG. 4, the pattern layer 252 is formed with a pattern (e.g., an Arabic numeral pattern). Specifically, the pattern layer 252 has an opaque portion 256 that is impenetrable to light, and a light-permeable portion 257 that is light-permeable. The opaque portion 256 cooperates with the light-permeable portion 257 to form the pattern. In this embodiment, the light-permeable portion 257 is a through hole that is formed on the opaque portion 256, and has a shape of the pattern (e.g., an Arabic numeral of '1' as shown in FIG. 4). In other embodiments, the light-permeable portion 257 may be realized using transparent or translucent materials.

Referring to FIGS. 3 and 4, when the light emitting element 124 emits light, a portion of the light emitted by the light emitting element 124 sequentially penetrates through the light-permeable substrate 251, the light-permeable portion 257 of the pattern layer 252, the light-colored translucent layer 253, the light-permeable button cap 254, and the dark-colored translucent layer 255 from bottom to top of the button body 125. Consequently, an illuminated figure having a shape that is similar to the shape of the light-permeable portion 257 of the pattern layer 252 is visible on top of the button body 125 (i.e., on a top surface of the dark-colored translucent layer 255). For example, when the shape of the light-permeable portion 257 is one of the Arabic numerals, the shape of the illuminated figure is that Arabic numeral.

Referring to FIGS. 1 and 3, each of the illuminated buttons 123' has an illuminating state where the RC processing unit 121 controls the illuminated button 123' to emit light, and a non-illuminating state where the RC processing unit 121 controls the illuminated button 123' to not emit light. For each of the illuminated buttons 123', when the RC processing unit 121 controls the illuminated button 123' to emit light, the illuminated button 123' switches into the illuminating state, causing the illuminated figure to be clearly visible to the user. When the RC processing unit 121 controls the illuminated button 123' to not emit light, the illuminated button 123' switches into the non-illuminating state. That is to say, the RC processing unit 121 is able to control each of the illuminated buttons 123' to switch between the illuminating state and the non-illuminating state.

In this embodiment, a color of the light-colored translucent layer 253 is, for example, a translucent white. A color of the dark-colored translucent layer 255 is, for example, a translucent dark gray. A degree of transmittance of the dark-colored translucent layer 255 is lower than a degree of transmittance of the light-colored translucent layer 253. For each of the illuminated buttons 123', when the illuminated button 123' is in the non-illuminating state, the dark-colored translucent layer 255 makes it harder for the user to directly see the pattern on the pattern layer 252 through the light-permeable button cap 254 and the light-colored translucent layer 253. That is to say, the pattern on the pattern layer 252 is less visible when the light emitting element 124 is not emitting light. Therefore, the dark-colored translucent layer 255 provides a visual contrast for the illuminated button 123' between when the illuminated button 123' is in the illuminating state and when the illuminated button 123' is in the non-illuminating state, thereby strengthening a visual cue for the user when the illuminated button 123' is in the illuminating state.

In other embodiments, the set of buttons 123 may include only one illuminated button 123', or may include only the illuminated buttons 123' (i.e., without any of the non-illuminated buttons 123"). Therefore, the buttons 123 may be realized by including one or more illuminated buttons 123', but is not limited in this respect to this disclosure.

Referring to FIG. 1, for ease of illustration, a first one of the electrical appliances 5 and a second one of the electrical appliances 5 are referred to as "the first electrical appliance (5A)" and "the second electrical appliance (5B)", respectively hereinafter. Referring to FIG. 2, for illustration purposes, one of the illuminated buttons 123' (i.e., the illuminated button 123' with the Arabic numeral "1" visible on the illuminated button 123') and another one of the illuminated buttons 123' (i.e., the illuminated button 123' with the Arabic numeral "2" visible on the illuminated button 123') are referred to as "the first button (123A)" and "the second button (123B)", respectively. In FIG. 2, the first button (123A) and the second button (123B) are in the illuminating state.

Referring to FIGS. 1, 2, and 5, a method of operating the display system 1 according to an embodiment of the present disclosure is provided.

In the illustration below, the method includes steps S1 to S6. The RC processing unit 121 controls the illuminated buttons 123' to switch into the non-illuminating state before starting step S1. That is to say, the illuminated buttons 123' have a default setting of being in the non-illuminating state.

In step S1, one of the illuminated buttons 123' outputs a first operating signal to the RC processing unit 121 upon being pressed when the one of the illuminated buttons 123' is in the non-illuminating state. The RC processing unit 121, in response to receipt of the first operating signal, generates a first command signal that corresponds to the first operating signal, and transmits the first command signal to the display processing unit 111 through the RC wireless communication unit 122.

In step S2, the display processing unit 111, in response to receipt of the first command signal from the RC processing unit 121 by way of Bluetooth® communication through the first display communication unit 113, executes a first operation that is related to operation of the display 11 based on the first command signal.

As a first example, in step S1, when the first button (123A) is pressed and outputs the first operating signal, the RC processing unit 121 transmits the first command signal that corresponds to the first operating signal outputted by the first button (123A). In step 2, the first operation is, for example, a channel switching procedure. The display processing unit 111 executes the channel switching procedure by, for example, setting an Arabic numeral "1" (i.e., the Arabic numeral as indicated on the first button (123A), and included in the first command signal when the first button (123A) is pressed) as a first character of a channel number. Once the display processing unit 111 determines that a channel number has been fully entered (e.g., a user pressing the first button (123A) three times to enter "111"), the display processing unit 111 controls the display unit 115 to display images received from a channel that corresponds to the channel number (e.g., channel 111). That is to say, in this first example, when the first button (123A) is in the non-illuminating state, a user can use the first button (123A) to enter the channel number of a TV channel that the user wishes to watch.

It should be noted that, data transmitted by the first command signal and actions done by the first operation depend on which one(s) of the illuminated button(s) 123' is (are) pressed by the user. Moreover, the first operation may be any well known operation of a conventional TV or monitor (e.g., adjusting the volume). Therefore, data transmitted by the first command signal and actions done by the first operation are not limited to the first example.

The display processing unit 111 includes a plurality of special modes. In step S3, when the display processing unit 111 is operating in one of the special modes, the display processing unit 111 generates an illumination trigger signal that corresponds to the one of the special modes, and transmits the illumination trigger signal to the RC processing unit 121 through the first display communication unit 113 for operating one or more of the illuminated button(s) 123'.

Specifically, the special modes are predetermined. Each of the special modes corresponds to a group of the illuminated buttons 123'. In this embodiment, the display processing unit 111 may switch to operate in one of the special modes actively (e.g., initiated by a user pressing a button on the RC 12 or the display 11) or passively (e.g., initiated by the display processing unit 111 when determining that a predetermined condition is satisfied). When the display processing unit 111 switches to operate in one of the special modes, the display processing unit 111 generates and transmits the illumination trigger signal for operating accordingly the group of the illuminated buttons 123' that corresponds to the one of the special modes.

It should be noted that, for each of the special modes, when the display processing unit 111 is operating in the special mode, the group of the illuminated buttons 123' that corresponds to the special mode is able to perform functions related to the special mode. In other words, the group of the illuminated buttons 123' that corresponds to each of the special modes includes the illuminated button(s) that a user may need when the display processing unit 111 is operating in the special mode. Therefore, the groups of the illuminated buttons 123' that correspond respectively to the special modes may be different from each other.

In this embodiment, the special modes at least include an appliance control mode. The appliance control mode is related to controlling operation of the electrical appliances 5. When the display processing unit 111 is operating in the appliance control mode, the display processing unit 111 establishes a wireless network connection with the electrical appliances 5 through Wi-Fi communication, and remotely controls operation of the electrical appliances 5. Specifically, when the display processing unit 111 receives a mode-switching signal outputted by the RC processing unit 121, the display processing unit 111 switches to operate in the appliance control mode. The mode-switching signal is generated by the RC processing unit 121 when a specific button of the set of buttons 123 (may be one of the illuminated buttons 123' while being in the non-illuminating state or one of the non-illuminated buttons 123") is pressed, and transmitted to the display processing unit 111.

In this first example, when the display processing unit 111 receives the mode-switching signal, the display processing unit 111 switches to operate in the appliance control mode. For example, the group of the illuminated buttons 123' that corresponds to the appliance control mode includes the first button (123A) and the second button (123B). Therefore, in step S3, the display processing unit 111 generates the illumination trigger signal that is for operating the first button (123A) and the second button (123B), and transmits the illumination trigger signal through the first display communication unit 113.

Furthermore, since the display processing unit 111 has executed the pairing procedures, when operating in the appliance control mode, the display processing unit 111 associates, for example, the first electrical appliance (5A) with the first button (123A), and the second electrical appliance (5B) with the second button (123B).

In step S4, the RC processing unit 121, in response to receipt of the illumination trigger signal from the display processing unit 111 through the RC communication unit 122, controls one or more of the illuminated button(s) 123' to switch from the non-illuminating state to the illuminating state.

In the first example, as the illumination trigger signal is for operating the first button (123A) and the second button (123B), the RC processing unit 121, in response to receipt of the illumination trigger signal, controls the first button (123A) and the second button (123B) to switch from the non-illuminating state to the illuminating state. When the first button (123A) and the second button (123B) are in the illuminating state, the first button (123A) and the second button (123B) present the visual cue to the user to notify the user to use the first button (123A) and the second button (123B) for further operation. Specifically, the user may use the first button (123A) to control operation of the first electrical appliance (5A), and may use the second button (123B) to control operation of the second electrical appliance (5B). Optionally, the RC processing unit 121 may control the first button (123A) and the second button (123B) to respectively emit light of different colors.

In step S5, one of the illuminated buttons 123' outputs a second operating signal to the RC processing unit 121 upon being pressed by the user when the one of the illuminated buttons 123' is in the illuminating state. The RC processing unit 121, in response to receipt of the second operating signal, generates a second command signal that corresponds to the second operating signal, and transmits the second command signal to the display processing unit 111 through the RC wireless communication unit 122. That is to say, the second command signal indicates that one of the illuminated buttons 123' is currently in the illuminating state.

Continuing from the first example, in step 5, the first button (123A) outputs the second operating signal to the RC processing unit 121 upon being pressed when the first button (123A) is in the illuminating state. The RC processing unit 121 then generates the second command signal that is for controlling operation of the first electrical appliance (5A), and transmits the second command signal to the display processing unit 111.

In step S6, when the display processing unit 111 receives the second command signal from the RC processing unit 121 by way of Bluetooth® communication through the first display communication unit 113, the display processing unit 111 executes a second operation that is different from the first operation based on the second command signal.

It should be noted that, from the first example illustrated thus far, when the first button (123A) is pressed while being in the non-illuminating state, the RC processing unit 121 generates and transmits the first command signal (step 1), and when the first button (123A) is pressed while being in the illuminating state, the RC processing unit 121 generates and transmits the second command signal (step 5). Furthermore, the display processing unit 111 executes the first operation (step 2) and the second operation (step 6) that are different from each other in response to receiving the first command signal and the second command signal, respectively. Therefore, each of the illuminated buttons 123' is able to provide different functions when being operated respectively in the non-illuminating state and the illuminating state. Such a configuration is conducive to reducing the minimum number of buttons included in the set of buttons

123, which is the minimum number the RC 12 is required to have. This reduces the size of the RC 12 and further reduces the burden of operating the RC 12 by the user.

In the first example where the first button (123A) is pressed while being in the illuminating state, the second operation is a remote controlled operation for controlling operation of the first electrical appliance (5A). The display processing unit 111 executes the remote controlled operation by establishing a wireless connection by way of Wi-Fi communication with the first electrical appliance (5A), and controlling operation of the first electrical appliance (5A) therethrough.

Specifically, the display processing unit 111 executes the remote controlled operation by first selecting one of the reference command codes (D1) that matches with the second command signal (e.g., content of the one of the reference command codes (D1) the same as content of the second command signal) from among the reference command codes (D1). Then, the display processing unit 111 generates a control signal based on one of the control command codes (D2) that corresponds to the one of the reference command codes (D1) thus selected, and transmits the control signal to the first electrical appliance (5A) for controlling the first electrical appliance (5A) through the second display communication unit 114. In the first example, the content of the second command signal when the first button (123A) is pressed may be a binary code of an ASCII value of digit "1", and the one of the reference command codes (D1) that is selected is the one having the content of the ASCII value of digit "1". Then, the display processing unit 111 generates the control signal based on the control command code (D2) that corresponds to the one of the reference command codes (D1) thus selected. Through this configuration, the display processing unit 111 may convert the second command signal received from the RC processing unit 121 into the control signal that includes the control command code (D2) recognizable by the first electrical appliance 5A.

For example, the control signal may be used to switch the first electrical appliance (5A) to a connection standby state. When the first electrical appliance (5A) is in the connection standby state, the first electrical appliance (5A) is ready for receiving additional signals from the display processing unit 111 through Wi-Fi communication and operating accordingly. Alternatively, the control signal may be used to operate the first electric appliance (5A) in a specific manner. For example, in a case that the first electrical appliance (5A) is an air conditioner, the control signal may be used to cause the air conditioner to start cooling. In another case that the first electrical appliance (5A) is a dehumidifier, the control signal may be used to cause the dehumidifier to start dehumidification. In another case that the first electrical appliance (5A) is a refrigerator, the control signal may be used to cause the refrigerator to start making ice quickly.

In the first example mentioned above, not only can the user use the RC 12 to control the display 11, but the user can also use the RC 12 to control the electrical appliances 5. Therefore, the RC 12 of this embodiment is able to remotely control multiple devices, thereby making daily life of the user more convenient.

It should be noted that, when the user wants to remotely control the first electrical appliance (5A) using the RC 12, and presses the first button (123A) when the first button (123A) is in the illuminating state, the RC processing unit 121 generates the second command signal based on the second operating signal from the first button (123A) and transmits the second command signal to the display processing unit 111 through the RC communication unit 122

(step 5). Then, the display processing unit 111 generates the control signal based on the second command signal, and transmits the control signal to the first electrical appliance (5A) through the second display communication unit 114 (step 6).

The RC 12 operates with power provided by a battery (not shown), and due to the RC 12 having a capability of remotely controlling multiple devices, the RC 12 may be frequently operated by the user. Based on the aforementioned consideration, and since Bluetooth® communication is more power-saving than Wi-Fi communication, the RC processing unit 121 communicates with the display processing unit 111 via Bluetooth® communication, and the display processing unit 111 communicates with the first electrical appliance (5A) via Wi-Fi communication. With these configurations, operations of the RC 12 may be more power-saving. Moreover, even if the electrical appliances 5 may only receive the control signal through Wi-Fi communication, a power-saving effect of the RC 12 will not be affected.

The above illustrates the first example of how the display system 1 operates according to an embodiment of this disclosure.

It should be noted that, the aforementioned steps S1 and S5 both involve manual operations of the user on the RC 12, and step S3 may also involve human intervention. Since the user may freely operate the RC 12, it should be understood that, in between steps S4 and S5, the RC processing unit 121 may execute additional operations based on actions of the user. Similarly, in between steps S2 and S3, the display processing unit 111 may also execute other operations based on actions of the user. In other words, there may be other steps in between the above-mentioned steps S1 and S6. Therefore, the method of operating the display system 1 in this disclosure is not limited to the above-mentioned sequence of step S1 to step S6 and the flow as shown in FIG. 5.

The following will illustrate other examples of how the display system 1 operates according to an embodiment of this disclosure.

In this embodiment, in regards to the special modes mentioned in step S3, aside from the appliance control mode, the special modes may further include, for example, but not limited to, a password verification mode, an update reminder mode, a streaming video control mode, and an ambient light adjustment mode.

Using the password verification mode as a second example, when the display processing unit 111 determines that a preset password is required for verification based on the first command signal transmitted from the RC processing unit 121, the display processing unit 111 switches to the password verification mode.

When the display processing unit 111 is operating in the password verification mode, the display processing unit 111 will perform step S3, and transmit the illumination trigger signal that corresponds to the password verification mode to the RC processing unit 121. The RC processing unit 121 then performs step S4, and controls the illuminated buttons 123' to switch from the non-illuminating state to the illuminating state based on the illumination trigger signal. The illuminated buttons 123' that are switched to the illuminating state in this example are the illuminated buttons 123' to be used by the user to enter a user-input password.

In step S5 of this second example, the RC processing unit 121 generates the second command signal to include the user-input password in response to receipt of the second operating signal. The user-input password includes characters that are each entered by the user using one of the illuminated buttons 123' that corresponds to the password verification mode. Moreover, the RC processing unit 121 generating and transmitting the second command signal is by, for example, automatically generating and transmitting the second command signal that includes the user-input password when the RC processing unit 121 receives a last one of the characters of the user-input password (e.g., a sixth one of the characters when a number of characters of the preset password is six).

Next, the flow goes to step S6, where the display processing unit 111 executes the second operation. In the second example, the second operation includes verifying the user-input password included in the second command signal in response to receipt of the second command signal. Specifically, the display processing unit 111 verifies the user-input password to determine whether to unlock one or more multimedia files or channels that are password-protected.

Using the update reminder mode as a third example, when the display processing unit 111 receives a client-end program update notification from an audio-visual streaming platform server (not shown), the display processing unit 111 switches to the update reminder mode accordingly.

When the display processing unit 111 is operating in the update reminder mode, the display processing unit 111 performs step S3, and transmits the illumination trigger signal that corresponds to the update reminder mode to the RC processing unit 121. The RC processing unit 121 then performs step S4, and controls, for example, one of the illuminated buttons 123' based on the illumination trigger signal, to switch to the illuminating state. For example, in the third example, the one of the illuminated buttons 123' is configured to emit light in a blinking manner in the illuminating state.

In step S5 of this third example, the RC processing unit 121 generates the second command signal that indicates confirmation of update (hereinafter referred to as "the confirmation command signal"). Specifically, when one of the illuminated buttons 123' that corresponds to the update reminder mode (e.g., the one of the illuminated buttons 123' that is controlled to emit light in the blinking manner) is pressed, the one of the illuminated buttons 123' generates and transmits the second operating signal to the RC processing unit 121. Then, the RC processing unit 121 generates the confirmation command signal, and transmits the confirmation command signal to the display processing unit 111.

Next, the flow goes to step S6, where the display processing unit 111 executes the second operation that includes performing a program update procedure. A way of the display processing unit 111 performing the program update procedure may be, for example, by downloading an update file from the audio-visual streaming platform server and installing the update file to update an audio-visual streaming platform application program installed in the storage unit 112.

Using the streaming video control mode as a fourth example, when the display processing unit 111 determines that a streaming video media is selected based on the first command signal received from the RC processing unit 121, the display processing unit 111 switches to the streaming video control mode accordingly. When the display processing unit 111 is operating in the streaming video control mode, the display processing unit 111 may, for example, control the display unit 115 to display a video playback interface.

When the display processing unit 111 is switched to the streaming video control mode, the display processing unit 111 performs step S3, and transmits the illumination trigger signal that corresponds to the streaming video control mode to the RC processing unit 121. The RC processing unit 121 then performs step S4, and controls the illuminated buttons 123' to switch from the non-illuminating state to the illuminating state based on the illumination trigger signal. The illuminated buttons 123' that are switched to the illuminating state in this example are the illuminated buttons 123' to be used for playing, pausing, rewinding, and fast forwarding a video.

In this fourth example, the flow then goes to step S5, where the RC processing unit 121 generates the second command signal for playback control (i.e., playing, pausing, rewinding, and fast forwarding a video). Specifically, when one of the illuminated buttons 123' that corresponds to the streaming video control mode is pressed, the one of the illuminated buttons 123' generates and transmits the second operating signal to the RC processing unit 121. Then, the RC processing unit 121 generates the second command signal, and transmits the second command signal for playback control to the display processing unit 111.

Next, the flow goes to step S6, where the display processing unit 111 executes the second operation that includes controlling playback of the video. The display processing unit 111 controls playback of the video by, for example, playing, pausing, rewinding or fast forwarding the video.

In some embodiments, the display 11 further includes an ambient light 116 electrically connected to the display processing unit 111 (see FIG. 1). Using the ambient light adjustment mode as a fifth example, when the display processing unit 111 determines that an ambient light adjustment mode is selected based on the first command signal received from the RC processing unit 121, the display processing unit 111 switches to the ambient light adjustment mode accordingly. In the ambient light adjustment mode, the display processing unit 111, for example, controls the display unit 115 to display an ambient light adjustment interface. The ambient light adjustment interface is used to adjust the ambient light 116. The ambient light 116 is exemplified using, for example, Ambilight technology developed by Philips Corporation.

When the display processing unit 111 is operating in the ambient light adjustment mode, the display processing unit 111 performs step S3, and transmits the illumination trigger signal that corresponds to the ambient light adjustment mode to the RC processing unit 121. The RC processing unit 121 then performs step S4, and controls the illuminated buttons 123' to switch to the illuminating state based on the illumination trigger signal. The illuminated buttons 123' that are switched to the illuminating state in this example are the illuminated buttons 123' to be used for adjusting the ambient light 116 of the display 11.

In step S5 of this fifth example, the RC processing unit 121 generates the second command signal for adjusting the ambient light 116 of the display 11. Specifically, when one of the illuminated buttons 123' that corresponds to the ambient light adjustment mode is pressed, the one of the illuminated buttons 123' generates and transmits the second operating signal to the RC processing unit 121. Then, the RC processing unit 121 generates the second command signal, and transmits the second command signal for adjusting the ambient light 116 of the display 11 to the display processing unit 111.

Next, the flow goes to step S6, where the display processing unit 111 executes the second operation that includes adjusting brightness or color of the ambient light 116 of the display 11.

In sum, by implementing the method of operating the display system 1 according to this disclosure, each of the illuminated buttons 123' of the RC 12 may perform different functions when being respectively in the illuminating state and the non-illuminating state. This arrangement is beneficial to reducing the minimum number of buttons the RC 12 is required to have, and is helpful in reducing a size of the RC 12 as well as reducing the burden of a user when operating the RC 12.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A display system, comprising:

a display including a display processing unit; and a remote control (RC) including an RC processing unit that is configured to be wirelessly connected to said display processing unit, and an illuminated button that is electrically connected to said RC processing unit, said illuminated button being configured to be controlled by said RC processing unit to switch between an illuminating state and a non-illuminating state, wherein said illuminated button is configured to output a first operating signal to said RC processing unit upon being pressed when said illuminated button is in the non-illuminating state, said RC processing unit is configured to, in response to receipt of the first operating signal, generate a first command signal that corresponds to the first operating signal and transmit the first command signal to said display processing unit, and said display processing unit is configured to, in response to receipt of the first command signal, execute a first operation that is related to operation of said display based on the first command signal, wherein, when said display processing unit is in a special mode, said display processing unit is configured to transmit an illumination trigger signal to said RC processing unit for operating said illuminated button, and said RC processing unit is further configured to, in response to receipt of the illumination trigger signal, control said illuminated button to switch from the non-illuminating state to the illuminating state, wherein said illuminated button is further configured to output a second operating signal to said RC processing unit upon being pressed when said illuminated button is in the illuminating state, said RC processing unit is further configured to, in response to receipt of the second operating signal, generate a second command signal that corresponds to the second operating signal and transmit the second command signal to said display processing unit, and said display processing unit is further configured to, in response to receipt of the second command signal, execute a second operation that is different from the first operation based on the second command signal.

2. The display system as claimed in claim 1, wherein said display processing unit is adapted to be electrically connected to an electrical appliance, the special mode includes an appliance control mode related to controlling operation of the electrical appliance, and said display processing unit is configured to transmit the illumination trigger signal to said RC processing unit when said display processing unit is in the appliance control mode, wherein said display processing unit is configured to, when operating in the appliance control mode, execute the second operation to control operation of the electrical appliance in response to receipt of the second command signal.

3. The display system as claimed in claim 2, wherein said display further includes a storage unit electrically connected to said display processing unit, said storage unit storing a plurality of reference command codes, and a plurality of control command codes that correspond respectively to the plurality of reference command codes, wherein said display processing unit is configured to execute the second operation to control operation of the electrical appliance by selecting one of the plurality of reference command codes that matches with the second command signal from among the plurality of reference command codes, generating a control signal based on one of the plurality of control command codes that corresponds to the one of the plurality of reference command codes thus selected, and transmitting the control signal to the electrical appliance for controlling the electrical appliance.

4. The display system as claimed in claim 2, wherein said RC processing unit and said display processing unit are wirelessly connected to each other via Bluetooth® communication; and wherein said display processing unit is configured to execute the second operation to control operation of the electrical appliance further by communicating with the electrical appliance through a Wi-Fi network.

5. The display system as claimed in claim 1, wherein the special mode includes a password verification mode, said RC processing unit is configured to generate the second command signal to include a user-input password in response to receipt of the second operating signal, and said display processing unit is configured to, when operating in the password verification mode, execute the second operation that includes verifying the user-input password included in the second command signal in response to receipt of the second command signal.

6. The display system as claimed in claim 1, wherein the special mode includes an update reminder mode, said RC processing unit is configured to generate the second command signal indicating confirmation of update, and said display processing unit is configured to, when operating in the update reminder mode, execute the second operation that includes performing a program update procedure in response to receipt of the second command signal.

7. The display system as claimed in claim 1, wherein the special mode includes a streaming video control mode, said RC processing unit is configured to generate the second command signal for playback control, and said display processing unit is configured to, when operating in the streaming video control mode, execute the second operation that includes one of playing a video, pausing a video, rewinding a video, and fast forwarding a video in response to receipt of the second command signal.

8. The display system as claimed in claim 1, wherein said display further includes an ambient light, the special mode includes an ambient light adjustment mode, said RC processing unit is configured to generate the second command signal for adjusting said ambient light of said display, and said display processing unit is configured to, when operating in the ambient light adjustment mode, execute the second operation that includes adjusting one of brightness and color of said ambient light of said display in response to receipt of the second command signal.

9. The display system as claimed in claim 1, wherein said illuminated button includes a light emitting element that is electrically connected to said RC processing unit, and a button body that is disposed on said light emitting element;

wherein said button body includes a light-permeable substrate, a pattern layer disposed on said light-permeable substrate and formed with a pattern, a light-permeable button cap disposed on said pattern layer, and a translucent layer disposed on said pattern layer, said pattern layer having an opaque portion and a light-permeable portion that cooperate with each other to form the pattern;

wherein said RC processing unit is configured to control said illuminated button to switch to the illuminating state by controlling said light emitting element to emit light, and control said illuminated button to switch to the non-illuminating state by controlling said light emitting element to not emit light.

10. A method of operating a display system as claimed in claim 1, the method comprising steps of:

outputting, by the illuminated button, a first operating signal to the RC processing unit upon being pressed when the illuminated button is in the non-illuminating state;

in response to receipt of the first operating signal, generating, by the RC processing unit, a first command signal that corresponds to the first operating signal, and transmitting the first command signal to the display processing unit;

in response to receipt of the first command signal, executing, by the display processing unit, a first operation that is related to operation of the display based on the first command signal;

when the display processing unit is in a special mode, transmitting, by the display processing unit, an illumination trigger signal to the RC processing unit for operating the illuminated button;

in response to receipt of the illumination trigger signal, controlling, by the RC processing unit, the illuminated button to switch from the non-illuminating state to the illuminating state;

outputting, by the illuminated button, a second operating signal to the RC processing unit upon being pressed when the illuminated button is in the illuminating state;

in response to receipt of the second operating signal, generating, by the RC processing unit, a second command signal that corresponds to the second operating signal and transmitting the second command signal to the display processing unit; and in response to receipt of the second command signal, executing, by the display processing unit, a second operation that is different from the first operation based on the second command signal.

11. The method as claimed in claim 10, the display processing unit being electrically connected to an electrical appliance, the special mode including an appliance control mode related to controlling operation of the electrical appliance, the display further including a storage unit that is electrically connected to the display processing unit, the storage unit storing a plurality of reference command codes, and a plurality of control command codes that correspond respectively to the plurality of reference command codes, wherein when the display processing unit operates in the appliance control mode, the step of executing the second operation is to control operation of the electrical appliance, and includes sub-steps of, selecting one of the plurality of reference command codes that matches with the second command signal from among the plurality of reference command codes, generating a control signal based on one of the plurality of control command codes that corresponds to the one of the plurality of reference command codes thus selected, and transmitting the control signal to the electrical appliance for controlling the electrical appliance.

12. The method as claimed in claim 10, the special mode including a password verification mode, wherein the second command signal is generated by the RC processing unit to include a user-input password in response to receipt of the second operating signal, and when the display processing unit operates in the password verification mode, the step of executing the second operation includes verifying the user-input password included in the second command signal in response to receipt of the second command signal.

13. The method as claimed in claim 10, the special mode including an update reminder mode, wherein the second command signal indicates confirmation of update, and when the display processing unit operates in the update reminder mode, the step of executing the second operation includes performing a program update procedure in response to receipt of the second command signal.

14. The method as claimed in claim 10, the special mode including a streaming video control mode, wherein the second command signal is generated by the RC processing unit for playback control, and when the display processing unit operates in the streaming video control mode, the step of executing the second operation includes one of playing a video, pausing a video, rewinding a video, and fast forwarding a video in response to receipt of the second command signal.

15. The method as claimed in claim 10, the display further including an ambient light, the special mode including an ambient light adjustment mode, wherein the second command signal is generated by the RC processing unit for adjusting the ambient light of the display, and when the display processing unit operates in the ambient light adjustment mode, the step of executing the second operation includes adjusting one of brightness and color of the ambient light of the display in response to receipt of the second command signal.

*    *    *    *    *